United States Patent
Kalinli

(10) Patent No.: US 8,676,574 B2
(45) Date of Patent: Mar. 18, 2014

(54) METHOD FOR TONE/INTONATION RECOGNITION USING AUDITORY ATTENTION CUES

(75) Inventor: Ozlem Kalinli, Burlingame, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 642 days.

(21) Appl. No.: 12/943,774

(22) Filed: Nov. 10, 2010

(65) Prior Publication Data

US 2012/0116756 A1    May 10, 2012

(51) Int. Cl.
*G10L 11/04*    (2006.01)

(52) U.S. Cl.
USPC ........... 704/207; 704/206; 704/243; 704/242; 704/246; 704/255

(58) Field of Classification Search
USPC .......... 704/207, 242, 245, 246, 255, 206, 243
See application file for complete search history.

(56) References Cited

U.S. PATENT DOCUMENTS

| | | | |
|---|---|---|---|
| 4,975,960 A | 12/1990 | Petajan | |
| 5,806,036 A | 9/1998 | Stork | |
| 5,852,669 A | 12/1998 | Eleftheriadis et al. | |
| 5,897,616 A | 4/1999 | Kanevsky et al. | |
| 6,161,090 A | 12/2000 | Kanevsky et al. | |
| 6,185,529 B1 | 2/2001 | Chen et al. | |
| 6,243,683 B1 | 6/2001 | Peters | |
| 6,529,871 B1 | 3/2003 | Kanevsky et al. | |
| 7,117,157 B1 | 10/2006 | Taylor | |
| 7,165,029 B2 | 1/2007 | Nefian | |
| 7,209,883 B2 | 4/2007 | Nefian | |
| 7,454,342 B2 | 11/2008 | Nefian et al. | |
| 7,472,063 B2 | 12/2008 | Nefian et al. | |
| 7,742,914 B2 * | 6/2010 | Kosek et al. | ................ 704/205 |
| 7,783,061 B2 | 8/2010 | Zalewski | |
| 7,809,145 B2 | 10/2010 | Mao | |
| 2001/0051871 A1 | 12/2001 | Kroeker | |
| 2002/0128827 A1 | 9/2002 | Bu et al. | |
| 2002/0135618 A1 | 9/2002 | Maes et al. | |
| 2003/0018475 A1 | 1/2003 | Basu et al. | |
| 2004/0231498 A1 | 11/2004 | Li et al. | |

(Continued)

OTHER PUBLICATIONS

Kalinli et al., 'Prominence detection using auditory attention cues and task-dependent high level information', IEEE, transaction on audio, speech, and language processing, vol. 17, No. 5 Jul. 2009.*

(Continued)

*Primary Examiner* — Qi Han
(74) *Attorney, Agent, or Firm* — Joshua D. Isenberg; JDI Patent

(57) ABSTRACT

In a spoken language processing method for tone/intonation recognition, an auditory spectrum may be determined for an input window of sound and one or more multi-scale features may be extracted from the auditory spectrum. Each multi-scale feature can be extracted using a separate two-dimensional spectro-temporal receptive filter. One or more feature maps corresponding to the one or more multi-scale features can be generated and an auditory gist vector can be extracted from each of the one or more feature maps. A cumulative gist vector may be obtained through augmentation of each auditory gist vector extracted from the one or more feature maps. One or more tonal characteristics corresponding to the input window of sound can be determined by mapping the cumulative gist vector to one or more tonal characteristics using a machine learning algorithm.

19 Claims, 6 Drawing Sheets

(56) References Cited

U.S. PATENT DOCUMENTS

| | | | |
|---|---|---|---|
| 2006/0025989 | A1 | 2/2006 | Mesgarani et al. |
| 2006/0239471 | A1 | 10/2006 | Mao |
| 2007/0016426 | A1 | 1/2007 | Hershey et al. |
| 2008/0133228 | A1 | 6/2008 | Rao |
| 2008/0201140 | A1 | 8/2008 | Wells et al. |
| 2008/0262839 | A1 | 10/2008 | Nonaka et al. |
| 2009/0173216 | A1 | 7/2009 | Gatzsche et al. |
| 2010/0121638 | A1 | 5/2010 | Pinson et al. |
| 2010/0280827 | A1* | 11/2010 | Mukerjee et al. ............. 704/236 |
| 2011/0004341 | A1 | 1/2011 | Sarvadevabhatla et al. |
| 2011/0075855 | A1 | 3/2011 | Oh et al. |
| 2012/0253812 | A1 | 10/2012 | Kalinli et al. |
| 2012/0259638 | A1 | 10/2012 | Kalinli |

OTHER PUBLICATIONS

Kakinli et al., Saliency-drive unstructured acoustic scene classification using latent perceptual indexing, IEEE, MMSP'09, Oct. 5-7, 2009.*

International Search Report & Written Opinion in International Application No. PCT/US2011/052192 mailed Apr. 9, 2012.

Henning Risvik, "Principal Component Analysis (PCA) & NIPALS algorithm", May 10, 2007, dowloaded from http://share.auditory.ru/2006/Ivan.Ignatyev/AD/pca_nipals.pdf.

"Yoshio Matsumoto et al, ""An Algorithm for Real-time Stereo Vision Implementation of Head Pose and Gaze Direction Measurement"", IEEE International Conference on Automatic Face and Gesture Recognition—FGR, pp. 499-505, 2000".

Athanasios Nikolaidis et al, "Facial feature extraction and pose determination", Pattern Recognition, vol. 33 pp. 1783-1791, 2000.

Chris Ziegler, "Tobii and Lenovo show off prototype eye-controlled laptop, we go eyes-on (video)" downloaded from the Internet, downloaded from <http://www.engadget.com/2011/03/01/tobii-and-lenovo-show-off-prototype-eye-controlled-laptop-we-go/>, Mar. 1, 2011.

Dagen Wang et al. "Robust Speech Rate Estimation for Spontaneous Speech", IEEE Transactions on Audio, Speech, and Language Processing, vol. 15, No. 8, Nov. 2007.

Erik Murphy-Chutorian, "Head Pose Estimation in Computer Vision: A Survey", IEEE Transactions on Pattern Analysis and Machine Intelligence, vol. 31, No. 4, pp. 607-626, 2009.

Extended European Search Report dated Jul. 3, 2012 issued for European Patent Application No. 12162896.0.

International Search Report issued date Mar. 8, 2012 for International Application No. PCT/ US/2011/059004.

Qiang Ji et al, "3D face pose estimation and tracking from a monocular camera" in Image Vision and Computing, vol. 20m Issue 7, May 1, 2002, pp. 499-511.

T. Nagarajan et al. "Segmentation of speech into syllable-like units", Department of Computer Science and Engineering Indian Institute of Technology, Madras, Eurospeech 2003—Geneva.

Yaodong Zhang et al. "Speech Rhythm Guided Syllable Nuclei Detection" MIT Computer Science and Artificial Intelligence Laboratory, Cambridge, Massachusetts 02139, USA {ydzhang, glass}@csail.mit.edu, 2009.

Non Final Office Action mailed date Dec. 28, 2012 issued for U.S. Appl. No. 13/083,356.

U.S. Appl. No. 13/655,825 to Ozlem Kalinli-Akbacak, filed Oct. 19, 2012.

U.S. Appl. No. 13/655,834 to Ozlem Kalinli-Akbacak, filed Oct. 19, 2012.

Non Final Office Action dated Sep. 17, 2013 issued for U.S. Appl. No. 13/078,866.

* cited by examiner

| Method | Tone Accuracy using Mandarin Chinese Speech Database |
|---|---|
| Baseline (Chance) | 39.6 % |
| Tone Recognition using Prosodic Features (Prior Art Method) | 59.1% |
| Tone Recognition using Auditory Attention Cues (Invented Method) | 79.0% |

FIG. 2A

| Method | Pitch Accent Classification Accuracy using BURNC Database | Boundary Tone Classification Accuracy using BURNC Database |
|---|---|---|
| Baseline (Chance) | 54.4% | 60.5% |
| Intonation Recognition Using RFC Parameterization of Pitch Contour with Word Language Model (Prior Art Method) | 56.4% | 67.7% |
| Intonation Recognition Using Auditory Attention Cues (Invented Method) | 64.6% | 89.7% |

FIG. 2B

METHOD FOR TONE/INTONATION RECOGNITION USING AUDITORY ATTENTION CUES

FIELD OF THE INVENTION

Embodiments of the present invention are related to a method for implementing tone/intonation recognition of speech using auditory attention cues.

BACKGROUND OF THE INVENTION

Tone and intonation play an important role in speech recognition and natural language understanding. In many languages, intonation, variation of pitch while speaking, can be used for emphasis, posing a question, or conveying surprise, etc. For example, in standard American English, rising pitch at the end of a phrase often indicates that the speaker is asking a question instead of making a declaration ("He bought a car?" vs. "He bought a car"). Different from English and some western languages, tone languages such as Chinese use pitch to distinguish words.

In tone languages, syllables or words which have the exact same sequence of phonemes often map to different lexical entries when they have different tone patterns (i.e., pitch contours). For example, the words "mother" (mā), "hemp" (má), "horse" (mǎ), and "curse" (mà) are all pronounced "ma" in Mandarin, but each of them has a different tone pattern.

Because of aforementioned reasons, a detailed description of tone and intonation would be beneficial for many spoken language processing systems; i.e., to disambiguate words in automatic speech recognition, to detect different speech acts in dialog systems, to generate more naturally sounding speech in speech synthesis systems, etc. Hence, here, we focus on recognition of lexical tones in Mandarin and fine-grained intonation types, namely pitch accent and boundary tones, in English.

In the literature, for English, the detection of pitch accent and boundary tones has been largely explored; however the classification of pitch accent and boundary tone types hasn't been investigated much until recent years. Previously, prior art spoken language processing techniques combined pitch accent detection and classification tasks by creating a four-way classification problem with unaccented, high, low, and downstepped accent categories. More recently, prior art spoken language processing techniques have focused solely on the classification of pitch accent and boundary tone categories without the worry of detection.

In contrast to fine-grained intonation classification in English, lexical tone recognition in Mandarin has attracted attention of researchers for many years, and approaches can be grouped under two major categories: namely embedded and explicit tone modeling. In embedded tone modeling, tone related features are augmented to spectral features at each frame and is recognized as part of the existing system, whereas in explicit tone modeling, tones are independently modeled and recognized usually using supra-segmental features.

In traditional methods, including aforementioned work, prosodic features, such as pitch, duration, and energy features, were used for tone and intonation modeling. However, such traditional methods have not provided adequate tone recognition performance.

It is within this context that embodiments of the present invention arise.

BRIEF DESCRIPTION OF THE DRAWINGS

Embodiments of the present invention can be readily understood by referring to the following detailed description in conjunction with the accompanying drawings.

FIG. 2A is a table illustrating the accuracy of tone recognition according to an embodiment of the present invention as compared to the prior art.

FIG. 2B is a table illustrating the accuracy of intonation recognition according to an embodiment of the present invention as compared to the prior art.

DESCRIPTION OF THE SPECIFIC EMBODIMENTS

Embodiments of the present invention relate to spoken language processing methods and apparatus that use auditory attention cues for tone and intonation classification.

Figure 1A:
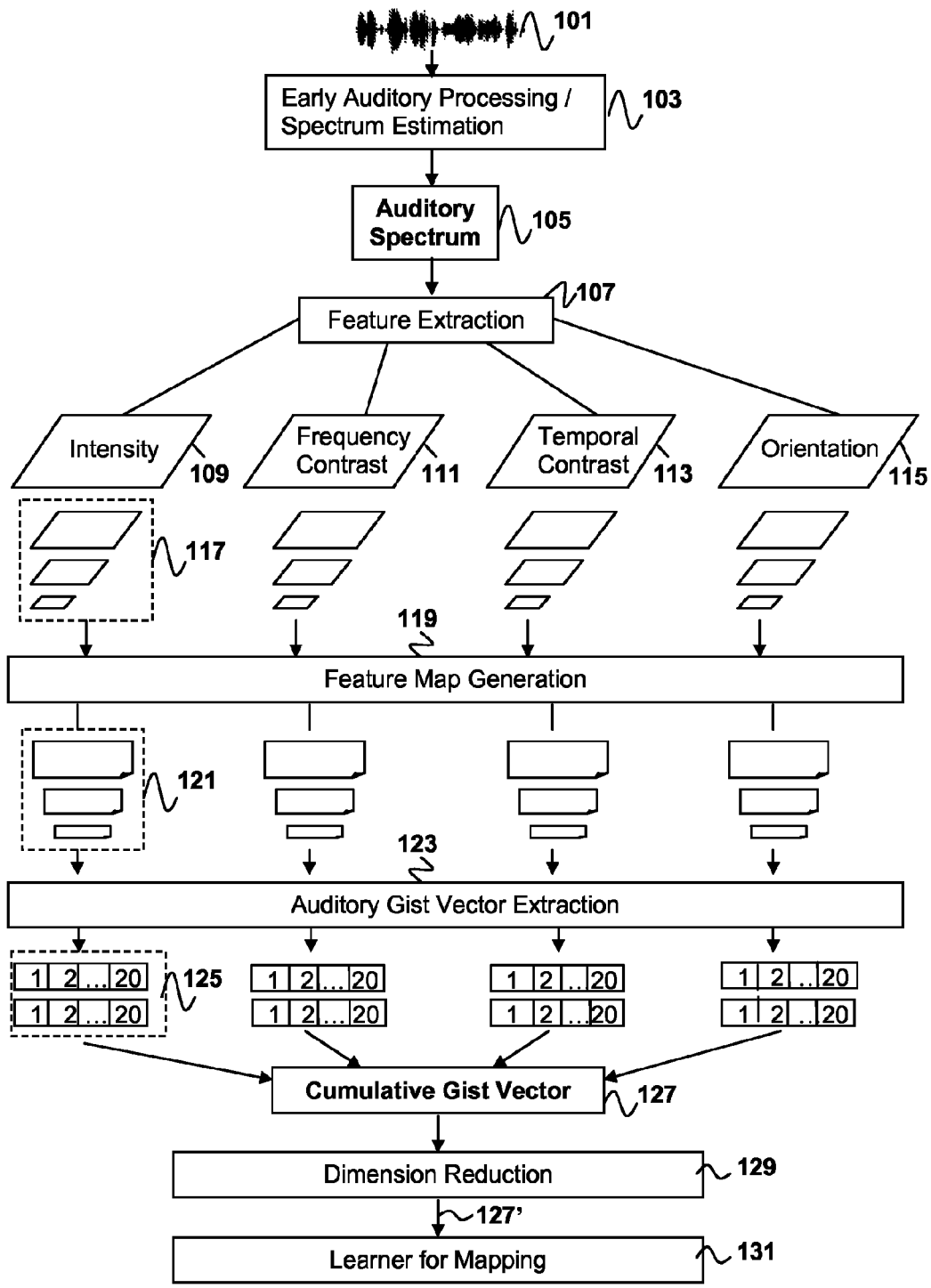
FIG. 1A is a flow diagram illustrating a method for tone/intonation recognition using auditory attention cues according to an embodiment of the present invention.
Figure 1B:
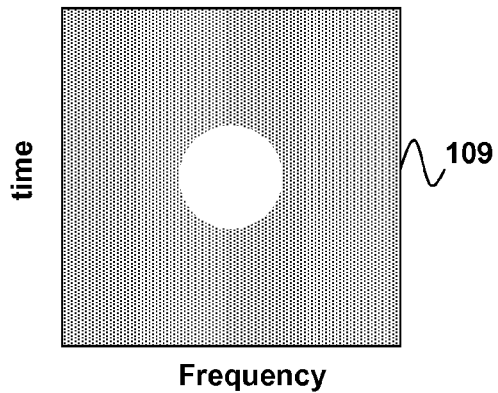
FIGS. 1B-1F are schematic diagrams illustrating examples of spectro-temporal receptive filters that can be used in embodiments of the present invention.

FIG. 1A is a flow diagram illustrating a method for tone/intonation recognition using auditory attention cues according to an embodiment of the present invention. The auditory attention model is biologically inspired and mimics the processing stages found in the human auditory system. It is designed to determine when and where sound signals attract human attention.

Initially an input window of sound 101 is received. By way of example, and not by way of limitation, this input window of sound 101 may be captured over a time window of some finite duration using a microphone which acts to convert the acoustic waves that characterize a particular input window of sound 101 into an electric signal for further processing. The input window of sound 101 may be any segment of a person's speech. By way of example, and not by way of limitation, the input window of sound 101 may contain a single syllable, word, sentence, or any combination of these. Although the input window 101 may be of any duration, experimentation has shown that the highest accuracy of tone class recognition may be achieved using a centered input window (i.e., one that captures a current syllable and extends to both previous and subsequent syllables as window duration permits) with a duration of about 0.8 seconds. Likewise, pitch accent intonation recognition experiences its highest rate of accuracy using an input window with duration of 1.2 seconds. Boundary tone intonation recognition can achieve 89.7% accuracy with window duration of 0.6 second. In addition, comparable performance can be achieved for reasonable shorter window durations, as well.

The input window of sound 101 is then passed through a set of processing stages 103 that operate to convert this window of sound 101 into an audio spectrum 105. These processing stages 103 can be based on the early processing stages of an auditory system, such as the human auditory system. By way of example, and not by way of limitation, the processing stages 103 may consist of cochlear filtering, inner hair cell, and lateral inhibitory stages mimicking the process from basilar membrane to the cochlear nucleus in the auditory system. The cochlear filtering may be implemented using a bank of 128 overlapping constant-Q asymmetric band pass filters with center frequencies that are uniformly distributed along a logarithmic frequency axis. These filters may be implemented by suitably configured electronic hardware, which may be purpose-built. Alternatively, the filters may be implemented on a general-purpose computer programmed with software that implements the functions of the filters. For analysis, 20 ms frames of audio with 10 ms shift can be used, which result in each audio frame being represented by a 128 dimensional vector.

Once the input window of sound 101 has been converted into an auditory spectrum 105, the spectrum 105 is analyzed by extracting multi-scale features 117, as indicated at 107, by mimicking the information processing stages in the central auditory system. Auditory attention can be captured by or voluntarily directed to a wide variety of acoustical features such as intensity (or energy), frequency, temporal, pitch, timbre, FM direction or slope (called "orientation" here), etc. These features can be selected and implemented to mimic the receptive fields in the primary auditory cortex.

By way of example, and not by way of limitation, four features that can be included in the model to encompass the aforementioned features are intensity (I), frequency contrast (F), temporal contrast (T), and orientation ($O_\theta$) with $\theta=\{45°, 135°\}$. The intensity feature captures signal characteristics related to the intensity or energy of the signal. The frequency contrast feature captures signal characteristics related to spectral (frequency) changes of the signal. The temporal contrast feature captures signal characteristics related to temporal changes in the signal. The orientation filters are sensitive to moving ripples in the signal.

Each feature may be extracted using two-dimensional spectro-temporal receptive filters 109, 111, 113, 115, which mimic the certain receptive fields in the primary auditory cortex. FIGS. 1B-1F respectively illustrate examples of the receptive filters (RF) 109, 111, 113, 115. Each of the receptive filters (RF) 109, 111, 113, 115 simulated for feature extraction is illustrated with gray scaled images corresponding to the feature being extracted. An excitation phase 110 and inhibition phase 112 are shown with white and black color, respectively.

Each of these filters 109, 111, 113, 115 is capable of detecting and capturing certain changes in signal characteristics. For example, the intensity filter 109 illustrated in FIG. 1B may be configured to mimic the receptive fields in the auditory cortex with only an excitatory phase selective for a particular region, so that it detects and captures changes in intensity/energy over the duration of the input window of sound. Similarly, the frequency contrast filter 111 depicted in FIG. 1C may be configured to correspond to receptive fields in the primary auditory cortex with an excitatory phase and simultaneous symmetric inhibitory sidebands. The temporal contrast filter 113 illustrated in FIG. 1D may be configured to correspond to the receptive fields with an inhibitory phase and a subsequent excitatory phase.

Figure 1C:
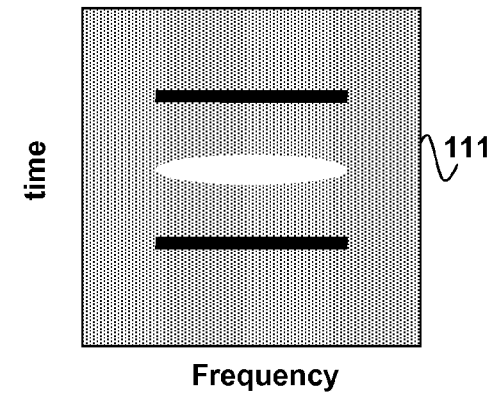
Figure 1D:
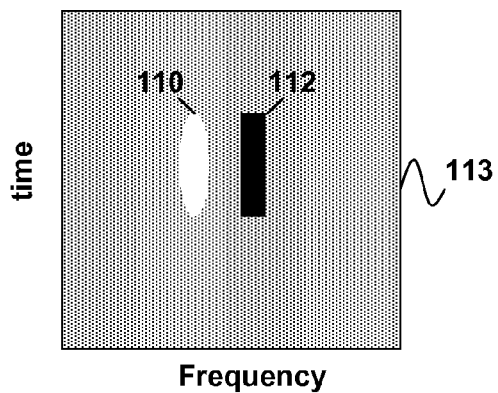
Figure 1E:
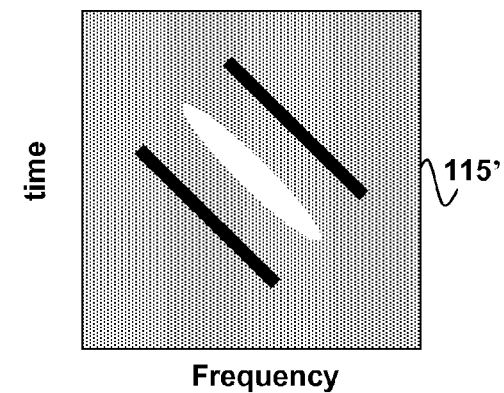
Figure 1F:
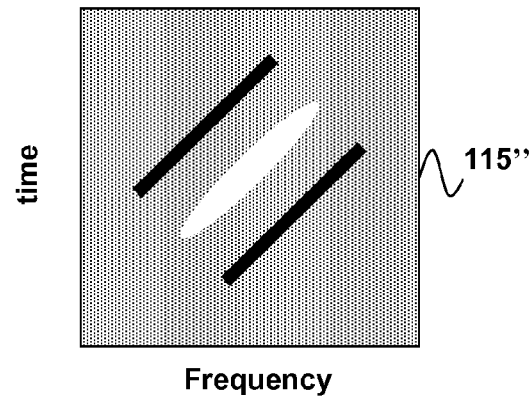

The frequency contrast filter 111 shown in FIG. 1C detects and captures spectral changes over the duration of the sound window. The temporal contrast filter 113 shown in FIG. 1D detects and captures changes in the temporal domain. The orientation filters 115' and 115" mimic the dynamics of the auditory neuron responses to moving ripples. The orientation filter 115' can be configured with excitation and inhibition phases having 45° orientation as shown in FIG. 1E to detect and capture when ripple is moving upwards. Similarly, the orientation filter 115" can be configured with excitation and inhibition phases having 135° orientation as shown in FIG. 1F to detect and capture when ripple is moving downwards. Hence, these filters also capture when pitch is rising or falling.

The RF for generating frequency contrast 111, temporal contrast 113 and orientation features 115 can be implemented using two-dimensional Gabor filters with varying angles. The filters used for frequency and temporal contrast features can be interpreted as horizontal and vertical orientation filters, respectively, and can be implemented with two-dimensional Gabor filters with 0° and 90°, orientations. Similarly, the orientation features can be extracted using two-dimensional Gabor filters with (45°, 135°) orientations. The RF for generating the intensity feature 109 is implemented using a two-dimensional Gaussian kernel.

The feature extraction 107 is completed using a multi-scale platform. The motivation for generating a scale-space representation of a given data set originates from the basic observation that objects are composed of different structures at different scales. For a system analyzing an unknown set of data, there is no way to know a priori what scales are appropriate for describing the interesting structures associated with the data. The only reasonable approach is thus to consider descriptions at multiple scales in order to capture the unknown scale variations that may occur. In embodiments of the present invention, the multi-scale features 117 may be obtained using a dyadic pyramid (i.e., the input spectrum is filtered and decimated by a factor of two, and this is repeated). As a result, eight scales are created (if the window duration is larger than 1.28 seconds, otherwise there are fewer scales), yielding size reduction factors ranging from 1:1 (scale 1) to 1:128 (scale 8). In contrast with prior art tone recognition techniques, the feature extraction 107 need not extract prosodic features from the input window of sound 101.

Prior art approaches to tone recognition often required that each speaker's prosodic features be normalized before distinguishing between tones, to ensure accuracy. For example, each speaker's pitch was normalized, since each speaker had a different baseline pitch when speaking (e.g., female voices compared to male voices) normalization was necessary in order to identify a relative pitch associated with a given tone for each individual speaker. In embodiments of the present invention, extracted features can capture the signal characteristic variations (i.e. relative intensity change) rather than the absolute values of signal characteristics due to the design of the filters used, and so normalization is no longer necessary for each individual speaker in order to recognize tones.

After multi-scale features 117 are obtained, feature maps 121 are generated as indicated at 119 using those multi-scale features 117. This is accomplished by computing "center-surround" differences, which involves comparing "center" (fine) scales with "surround" (coarser) scales. The center-surround operation mimics the properties of local cortical inhibition and detects the local temporal and spatial discontinuities. It is simulated by across scale subtraction ($\theta$) between a "center" fine scale (c) and a "surround" coarser scale (s), yielding a feature map M (c, s): $M(c, s) = |M(c) \theta M(s)|$, $M \in \{I, F, T, O_\theta\}$. The across scale subtraction between two scales is computed by interpolation to the finer scale and point-wise subtraction. By way of example, and not by way of limitation, c={2, 3, 4}, s=c+δ, with δ∈{3, 4} may be used, which results in a total of 30 feature maps when features are extracted at eight scales.

Next, an "auditory gist" vector 125 is extracted as indicated at 123 from each feature map 121 of I, F, T, $O_\theta$, such that the sum of auditory gist vectors 125 covers the entire input sound window 101 at low resolution. To determine the auditory gist vector 125 for a given feature map 121, the feature map 121 is first divided into an m-by-n grid of sub-regions, and statistics, such as maximum, minimum, mean, standard deviation etc., of each sub-region can be computed. By way of example, and not by way of limitation, the mean of each sub-region can be computed to capture the overall properties of the map. For a feature map $M_i$, with height h and width w, the computation of the auditory gist vector can be written as:

$$G_i^{k,l} = \frac{mn}{wh} \sum_{u=\frac{kw}{n}}^{\frac{(k+1)w}{n}-1} \sum_{v=\frac{lh}{m}}^{\frac{(l+1)h}{m}-1} M_i(u, v), \text{ for}$$

$$k = \{0, \ldots, n-1\}, l = \{0, \ldots, m-1\}.$$

An example of auditory gist vector extraction 123 with m=4, n=5 is shown in FIG. 1, where a 20-dimensional auditory gist vector 125 is shown to represent a feature map. These particular values of m and n are provided as for the sake of example and not as limitations on any embodiment of the invention.

After extracting an auditory gist vector 125 from each feature map 121, the auditory gist vectors are augmented and combined to create a cumulative gist vector 127. The cumulative gist vector 127 may additionally undergo a dimension reduction 129 technique to reduce dimension and redundancy in order to make tone recognition more practical. By way of example and not by way of limitation, principal component analysis (PCA) can be used for the dimension reduction 129. The result of the dimension reduction 129 is a reduced cumulative gist vector 127' that conveys the information in the cumulative gist vector 127 in fewer dimensions. PCA is commonly used as a primary technique in pattern recognition. As is generally understood, PCA is mathematically defined as an orthogonal linear transformation that transforms data to a new coordinate system such that the greatest variance by any projection of the data comes to lie on the first coordinate (called the first principal component), the second greatest variance on the second coordinate, and so on. PCA may be implemented on a computer programmed with suitably configured software. Examples of commercially available software that can implement dimension reduction through PCA include Matlab by MathWorks, Inc. of Natick, Mass., U.S.A. or Weka machine learning software, developed at the University of Waikato, New Zealand. Alternatively, other linear and nonlinear dimension reduction techniques, such as factor analysis, kernel PCA, linear discriminant analysis (LDA) and the like, may be used to implement the dimension reduction 129.

Finally, after the reduced cumulative gist vector 127' that characterizes the input sound window 101 has been determined, tone recognition may be performed. To perform tone recognition on a given input sound window, a machine learning algorithm 131, such as neural networks, nearest neighbor classifiers, decision trees, etc, can be used to discover the mapping between cumulative gist vectors 127 and tone class (es). By way of example and not by way of limitation, a neural network can be used as the machine learning algorithm 131 since it is biologically well motivated. In such a case, the neural network 131 can identify the tone class(es) of the input sound given the cumulative gist vector it is associated with.

As used herein, the term "neural network" refers to an interconnected group of natural or artificial neurons that uses a computational/mathematical model for information processing based on a connectionistic approach to computation. Neural networks are adaptive systems that change structure based on external or internal information that flows through the network. They are used to implement non-linear statistical data modeling and may be used to model complex relationships between inputs and outputs. In embodiments of the present invention, the neural network can be used for learning mapping between a group of auditory gist features represented by a cumulative auditory gist vector 127 or reduced cumulative gist vector 127' and one or more intonation or tone classes. By way of example, and not by way of limitation, a 3-layer neural network may be used. The neural network may have D inputs, (D+N)/2 hidden nodes and N output nodes, where D is the length of the cumulative auditory gist vector after PCA dimension reduction and N is the number of tonal classes to be distinguished (e.g., 4 tonal classes for Mandarin).

Additionally, by way of example, and not by way of limitation, the machine learning algorithm 131 may also be configured to perform intonation recognition rather than tone recognition. The neural network may be configured to map the cumulative gist vector 127 or 127' to different pitch accent types (e.g., rising, falling, dipping, or peaking) or even phrase boundaries to recognize different intonation within the window of sound 101. As used herein, "tone" is defined as the use of pitch variation in language to distinguish lexical meaning (i.e., to distinguish words). As used herein, "intonation", refers to variations in pitch that occur while speaking to distinguish grammatical meaning (e.g., to convey surprise or irony, to pose a question, etc.), but is not used to distinguish lexical meaning.

Once the tone or intonation within the window of sound 101 has been recognized a lexical or grammatical meaning may be extracted from the recognized tone or intonation. For example, a computer-implemented speech recognizer for a tonal language may have identified or may subsequently identify a set of possible word or syllable candidates for the window of sound 101, since two or more possible words/syllables, hence lexical meanings, may exist for the same phoneme sequence. As used herein, the term "phoneme" refers to a unit of spoken language used in spoken language processing, such as speech recognition. Typically, syllables or words are identified in terms of sequences of phonemes. The ambiguity in tone languages is due to the fact that the same sequence of phonemes can map to different words or syllables based on the tone. Hence, without tone information, a speech recognizer can only identify a set of possible words/syllables (such that they all have the same pronunciation). However, tone information is required to make a selection among this set of candidates and identify the correct lexical entry (i.e. word/syllable). Hence, the lexical meaning may be determined by combining the speech recognition output and the recognized tone within the window of sound 101, e.g., from a look-up table that has words/syllables with their associated tone information. If a match is found between the recognized tone and one of the possible tones, the corresponding lexical meaning can be stored, e.g., as electronic data or displayed, e.g., as recognized words or characters.

In a like manner, a computer-implemented spoken language processing algorithm may match an intonation recognized within the window of sound 101 to different possible grammatical meanings for an utterance (e.g., a recognized word or phrase). For example, different intonations of a word or syllable may signify whether an utterance is a statement or a question. The grammatical meaning for the recognized utterance may be determined, e.g., from a look-up table that correlates different possible intonations to different grammatical meanings for the recognized utterance. If a match is found between the recognized intonation and one of the possible intonations the corresponding grammatical meaning can be stored or displayed. For example, a question mark (?) may be displayed at the end of a recognized word or sentence if it is determined that the recognized intonation corresponds to intonation for a question. Similarly, a period (.) may be displayed at the end of a recognized word or sentence if it is determined that the recognized intonation corresponds to intonation for a statement.

FIG. 2A is a table illustrating the accuracy of tone recognition according to an embodiment of the present invention as compared to the prior art. Tone recognition experiments were conducted in Mandarin Chinese. In the experiments, a continuous Mandarin Chinese speech database that contains 7513 command-and-control utterances from 16 speakers (8 female and 8 male speakers) was used. There were approximately 28,000 syllables in the database. The database contained manual transcriptions of each spoken utterance together with a tone label for each syllable. To obtain syllable time boundaries, the recorded speech was force aligned to the reference transcriptions. In Mandarin Chinese, each Chinese character represents a monosyllable and has one of the five tones; high-level (tone 1), high-rising (tone 2), low-dipping (tone 3), high-falling (tone 4) and neutral (tone 5). The neutral tone usually occurs at word-ends or sentence-ends and does not have a stable pitch contour, so it was ignored in these experiments as in the prior art methods. For this database, the chance level is 39.6%, which is obtained by labeling all tones with the majority class after removing samples of neutral tone.

In the experiments, a 3-layer neural network was used for learning the mapping between auditory gist features and tone classes. The neural network has D inputs, (D+N)/2 hidden nodes and N output nodes, where D is the length of the cumulative gist vector after PCA dimension reduction, and N=4 since this is a 4-class problem. The accuracy was then measured with an optimal duration of the input window of sound (e.g., 0.8 s). Both a centered input window and a left-aligned input window were used for experimentation. The left-aligned input window captured the current syllable and extended to the previous syllables as permitted by the window duration. The centered input window captured the current syllable and extended to both previous and subsequent syllables as permitted by window duration. Because the centered input window performed significantly better than the left-aligned input window, the accuracy resulting from a centered input window was used.

The prior art method for tone recognition was also tested using the same database. Here, prosodic features consisting of pitch and duration features were extracted from the initial (consonant) and final part (vowel) of a syllable. Pitch contour was smoothed, normalized, and sampled to a fixed number of points. Context dependent features, which were generated augmenting features from the current and previous syllable as in the prior art method, were normalized per speaker and 59.1% tone recognition accuracy was obtained using these aforementioned context dependent prosodic features.

The prior art method of tone recognition had an accuracy of 59.1%, which is nearly 20% more accurate than the chance level. However, an embodiment of the inventive method (using auditory attention cues) provided a 20% absolute improvement over the prior art method (using traditional prosodic features), resulting in an accuracy of 79.0%.

FIG. 2B is a table illustrating the accuracy of intonation recognition according to an embodiment of the present invention as compared to the prior art. Here, the Boston University Radio News Corpus (BURNC) was used for the experiments in English. The BURNC is a broadcast news-style read speech corpus that consists of speech from 3 female and 3 male speakers, totaling about 3 hours of acoustic data with ToBI-style pitch accent and boundary tone annotations. Based on the distribution of pitch accent and boundary tone labels, the most common four pitch accent categories, namely 1) high, 2) down-stepped, 3) low, and 4) rising peak and two boundary tone categories (low phrase accent followed by a low/or high boundary tone) were used. Approximately 14.7K words carried one of these four pitch accent types and 5.6K of the words carried a boundary tone label. The chance levels, obtained by labeling all samples with the majority class, is 54.4% and 60.5% accuracy for pitch accent and boundary tone classification tasks, respectively.

As noted above, a 3-layer neural network described in FIG. 2A was used for mapping. The results indicated that the inventive method produced a pitch accent accuracy of 64.6% and a boundary tone accuracy of 89.7%. The prior art method, which used rise-fall-connection (RFC) parameterization of pitch contours combined with a word language model achieved a pitch accent accuracy of 56.4% and a boundary tone accuracy of 67.7%. The proposed method based on auditory attention cues thus provided a 10.2% improvement over the chance level and an 8.2% improvement over the prior art method in pitch accent classification. It also provided 29.2% improvement over chance level and 22% improvement over the prior art method in boundary tone classification.

Figure 3:
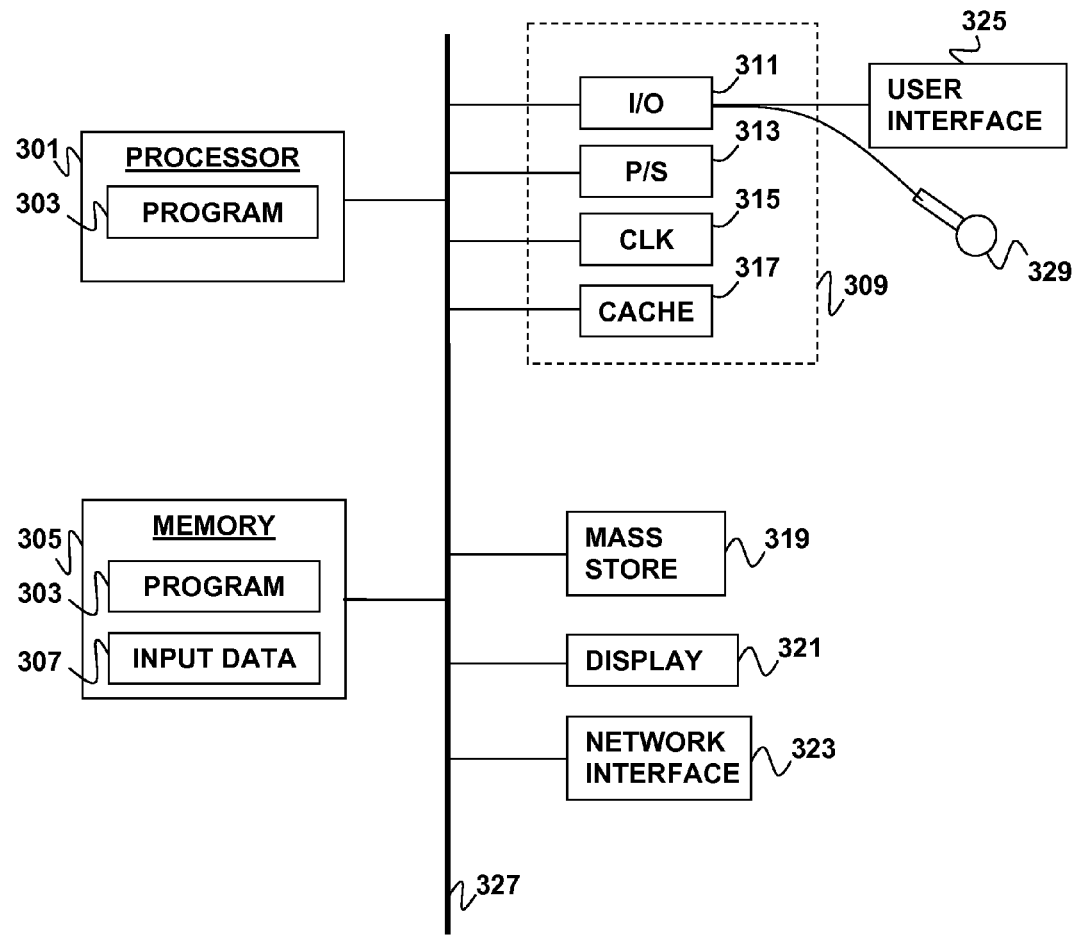
FIG. 3 is a block diagram illustrating an apparatus for tone/intonation recognition according to an embodiment of the present invention

Embodiments of the invention may be implemented on a suitably configured computer apparatus. FIG. 3 illustrates a block diagram of a computer apparatus that may be used to implement a method of tone/intonation recognition using auditory attention cues according to an embodiment of the present invention. The apparatus 300 generally may include a processor module 301 and a memory 305. The processor module 301 may include one or more processor cores. An example of a processing system that uses multiple processor modules, is a Cell Processor, examples of which are described in detail, e.g., in *Cell Broadband Engine Architecture*, which is available online at http://www-306.ibm.com/chips/techlib/techlib.nsf/techdocs/1AEEE1270EA2776387257060006E61B A/$file/CBEA_01_pub.pdf, which is incorporated herein by reference.

The memory 305 may be in the form of an integrated circuit, e.g., RAM, DRAM, ROM, and the like. The memory 305 may also be a main memory that is accessible by all of the processor modules. In some embodiments, the processor module 301 may have local memories associated with each core. A program 303 may be stored in the main memory 305 in the form of processor readable instructions that can be executed on the processor modules. The program 303 may be configured to perform tone/intonation recognition on a window of sound using auditory attention cues. The program 303 may be written in any suitable processor readable language, e.g., C, C++, JAVA, Assembly, MATLAB, FORTRAN, and a number of other languages. Input data 307 may also be stored in the memory. Such input data 307 may include input windows of sound, feature maps, or auditory gist vectors. During execution of the program 303, portions of program code and/or data may be loaded into the memory or the local stores of processor cores for parallel processing by multiple processor cores.

The apparatus 300 may also include well-known support functions 309, such as input/output (I/O) elements 311, power supplies (P/S) 313, a clock (CLK) 315, and a cache 317. The apparatus 300 may optionally include a mass storage device 319 such as a disk drive, CD-ROM drive, tape drive, or the like to store programs and/or data. The device 300 may optionally include a display unit 321 and user interface unit 325 to facilitate interaction between the apparatus and a user. The display unit 321 may be in the form of a cathode ray tube (CRT) or flat panel screen that displays text, numerals, graphical symbols or images. The user interface 325 may include a keyboard, mouse, joystick, light pen, or other device that may be used in conjunction with a graphical user interface (GUI). The apparatus 300 may also include a network interface 323 to enable the device to communicate with other devices over a network, such as the internet.

In some embodiments, the system 300 may include an optional microphone 329, which may be a single microphone or a microphone array. The microphone 329 can be coupled to the processor 301 via the I/O elements 311. By way of example, and not by way of limitation, different input windows of sound may be recorded using the microphone 329.

The components of the system 300, including the processor 301, memory 305, support functions 309, mass storage device 319, user interface 325, network interface 323, and display 321 may be operably connected to each other via one or more data buses 327. These components may be implemented in hardware, software or firmware or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid a latency associated with setting up the loop. As applied to embodiments of the present invention, multiple processors could extract different features from an input sound window in parallel. The intensity extraction filter, frequency contrast extraction filter, temporal contrast extraction filter, and orientation extraction filter could all process the auditory spectrum simultaneously, generating corresponding multi-scale features much more efficiently if implemented on different processor elements in parallel. Furthermore, feature maps could also be generated in parallel, as well as their corresponding auditory gist vectors. The ability to process data in parallel saves valuable processing time, leading to a more efficient and streamlined system for tone/intonation recognition.

Figure 4:
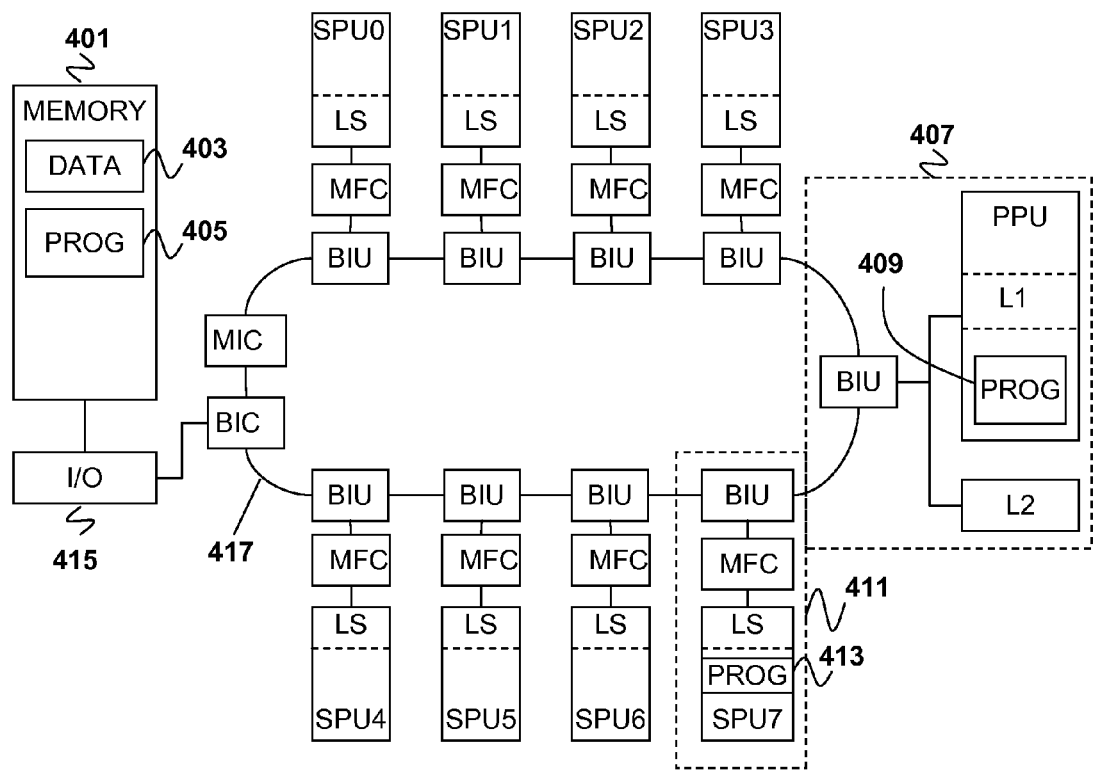
FIG. 4 is a block diagram illustrating an example of a cell processor implementation of an apparatus for tone/intonation recognition according to an embodiment of the present invention.

One example, among others of a processing system capable of implementing parallel processing is known as a cell processor. There are a number of different processor architectures that may be categorized as cell processors. By way of example, and without limitation, FIG. 4 illustrates a type of cell processor. The cell processor 400 includes a main memory 401, a single power processor element (PPE) 407, and eight synergistic processor elements (SPE) 411. Alternatively, the cell processor may be configured with any number of SPEs. With respect to FIG. 4, the memory 401, PPE 407 and SPEs 411 can communicate with each other and with an I/O device 415 over a ring-type element interconnect bus 417. The memory 401 contains input data 403 having features in common with the input data described above and a program 405 having features in common with the program described above. At least one of the SPEs 411 may include in its local store (LS) tone/intonation recognition instructions 413 and/or a portion of the input data that is to be processed in parallel, e.g. as described above. The PPE 407 may include in its L1 cache, tone/intonation recognition instructions 409 having features in common with the program described above. Instructions 405 and data 403 may also be stored in memory 401 for access by the SPE 411 and PPE 407 when needed.

By way of example, and not by way of limitation, different SPE 411 may implement extraction of the multi-scale features 117. Specifically, different SPE 411 may be respectively dedicated to parallel extraction of intensity (I), frequency contrast (F), temporal contrast (T), and orientation ($O_\theta$) features from the spectrum. Similarly, different SPE 411 may respectively implement feature map generation 119 or auditory gist vector extraction 123 for the intensity (I), frequency contrast (F), temporal contrast (T), and orientation ($O_\theta$) features.

By way of example, the PPE 407 may be a 64-bit PowerPC Processor Unit (PPU) with associated caches. The PPE 407 may include an optional vector multimedia extension unit. Each SPE 411 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPEs 411 allow the system to implement applications that require a higher computational unit density and can effectively use the provided instruction set. Managing a significant number of SPEs 411 by the PPE 407 allows for cost-effective processing over a wide range of applications. By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is available online at: http://www-306.ibm.com/chips/techlib/techlib.nsf/techdocs/1AEEE1270EA277638725706000E61B A/$file/CBEA_01_pub.pdf, which is incorporated herein by reference.

Figure 5:
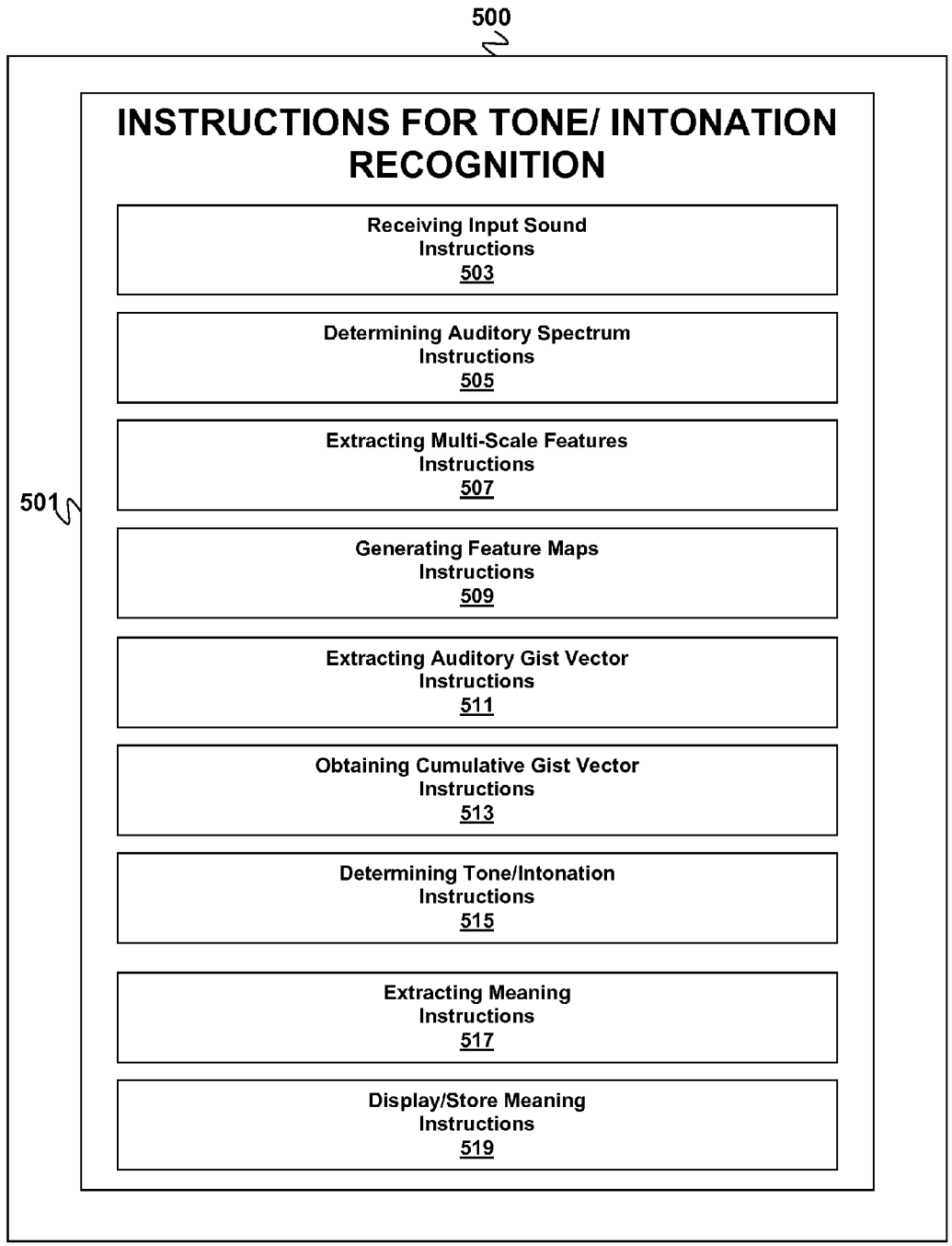
FIG. 5 illustrates an example of a non-transitory computer-readable storage medium with instructions for implementing tone/intonation recognition according to an embodiment of the present invention.

According to another embodiment, instructions for tone/intonation recognition using auditory attention cues may be stored in a computer readable storage medium. By way of example, and not by way of limitation, FIG. 5 illustrates an example of a non-transitory computer readable storage medium 500 in accordance with an embodiment of the present invention. The storage medium 500 contains computer-readable instructions stored in a format that can be retrieved, interpreted, and executed by a computer processing device. By way of example, and not by way of limitation, the computer-readable storage medium 500 may be a computer-readable memory, such as random access memory (RAM) or read only memory (ROM), a computer readable storage disk for a fixed disk drive (e.g., a hard disk drive), or a removable disk drive. In addition, the computer-readable storage medium 500 may be a flash memory device, a computer-readable tape, a CD-ROM, a DVD-ROM, a Blu-Ray, HD-DVD, UMD, or other optical storage medium.

The storage medium 500 contains tone/intonation recognition instructions 501 configured to facilitate tone/intonation recognition using auditory attention cues. The tone/intonation recognition instructions 501 may be configured to implement tone/intonation recognition in accordance with the method described above with respect to FIG. 1. In particular, the tone/intonation recognition instructions 501 may optionally include receiving input sound instructions 503 that are used to receive an input window of sound for which tone/intonation recognition is to be performed. The input window of sound may be obtained in computer-readable form from a recording or from sounds captured live at run time by a microphone or microphone array. The tone/intonation recognition instructions 501 may further include determining auditory spectrum instructions 505 that determine an auditory spectrum for the input window of sound using cochlear filtering, inner hair cell, and lateral inhibitory processing stages as described above.

The tone/intonation recognition instructions 501 may also include extracting multi-scale features instructions 507 that extract multi-scale features associated with auditory spectrum when executed. These multi-scale features may include intensity, frequency contrast, temporal contrast, and orientation, as described above. This may further trigger execution of the generating feature map instructions 509 that generate corresponding feature maps for each multi-scale feature extracted as discussed above when executed. At this point, the tone/intonation recognition instructions 501 may implement extracting auditory gist vector instructions 511 that extract a multi-parameter auditory gist vector for each feature map when executed.

The tone/intonation recognition instructions 501 may additionally include obtaining cumulative gist vector instructions 513 that augment and combine all of the auditory gist vectors into a single cumulative gist vector when executed. The cumulative gist vector instructions 513 may also be configured to implement principal component analysis (PCA) to remove redundancies and reduce the dimension of the cumulative gist vector when executed. The tone/intonation recognition instructions 501 may further include determining tone/intonation instructions 515 that map the cumulative gist vector to its corresponding tone class/intonation characteristic when executed.

The tone/intonation recognition instructions 501 may optionally include extracting meaning instructions 517 and display/store meaning instructions 519. Upon execution the extracting meaning instructions 517 may extract a lexical or grammatical meaning from a recognized tone or intonation obtained by execution of the determining tone/intonation instructions 515. The display/store meaning instructions 519 may cause a display associated with the aforementioned computer processing device to display characters or symbols representing the extracted lexical or grammatical meaning extracted when executed. Execution of the display/store meaning instructions 519 may also cause the computer processing device to store data representing the extracted lexical or grammatical meaning in an associated memory or storage device.

While the above is a complete description of the preferred embodiment of the present invention, it is possible to use various alternatives, modifications, and equivalents. Therefore, the scope of the present invention should be determined not with reference to the above description, but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. In the claims that follow, the word "or" is to be interpreted as a non-exclusive or, unless otherwise specified. The appended claims are not to be interpreted as including means-plus-function limitations, unless such a limitation is explicitly received in a given claim using the phrase "means for".

What is claimed is:

1. A method for tone recognition in spoken language processing, the method comprising:
   with a processor module,
   a) determining an auditory spectrum for an input window of sound;
   b) extracting one or more multi-scale features from the auditory spectrum, wherein each multi-scale feature is extracted using a separate two-dimensional spectro-temporal receptive filter;
   c) generating one or more feature maps corresponding to the one or more multi-scale features;
   d) extracting an auditory gist vector from each of the one or more feature maps;
   e) obtaining a cumulative gist vector through augmentation of each auditory gist vector extracted from the one or more feature maps;
   f) determining one or more tonal characteristics corresponding to the input window of sound by mapping the cumulative gist vector to one or more tonal characteristics using a machine learning algorithm;
   g) identifying a sequence of phonemes in the input window of sound, wherein the sequence of phonemes matches a plurality of different lexical meanings in a tone language;
   h) combining the identified sequence of phonemes with the determined tonal characteristics; and
   i) identifying a lexical meaning in the tone language of the combination from among the plurality of different lexical meanings by determining a match between the combination and a corresponding tone and phoneme sequence combination in a speech recognition database for the tone language.

2. The method of claim 1, further comprising extracting a lexical or grammatical meaning from a recognized tone or intonation from the tonal characteristics determined in f).

3. The method of claim 2, further comprising displaying or storing the lexical or grammatical meaning.

4. The method of claim 1 wherein the one or more multi-scale features do not include prosodic features.

5. The method of claim 1, wherein determining the auditory spectrum in a) involves passing the input window of sound through a cochlear filtering stage, inner hair cell stage, and lateral inhibitory stage that mimic transmission between the basilar membrane and the cochlear nucleus of an auditory system.

6. The method of claim 5, wherein the cochlear filtering stage is implemented using a bank of 128 overlapping constant-Q asymmetric band-pass filters.

7. The method of claim 1, wherein one of the multi-scale features in b) characterizes intensities associated with the auditory spectrum.

8. The method of claim 7, wherein one of the multi-scale features in b) characterizes frequency contrast associated with the auditory spectrum.

9. The method of claim 8, wherein one of the multi-scale features in b) characterizes temporal contrast associated with the auditory spectrum.

10. The method of claim 9, wherein one of the multi-scale features in b) characterizes orientations associated with the auditory spectrum.

11. The method of claim 1, wherein the one or more multi-scale features in b) are obtained using a dyadic pyramid.

12. The method of claim 1, wherein each feature map in c) is obtained by computing differences between one or more center scales associated with that particular multi-scale feature and one or more surround scales associated with that particular multi-scale feature.

13. The method of claim 1, wherein each auditory gist factor in d) is determined by dividing its corresponding feature map into an m-by-n grid of sub-regions and calculating statistics for each sub-region.

14. The method of claim 1, wherein e) includes using a dimension reduction method to remove redundancies or reduce dimensions of the cumulative gist vector.

15. The method of claim 1, wherein f) includes determining a tonal class for the input window of sound.

16. The method of claim 1, wherein f) includes determining a pitch accent for the input window of sound.

17. The method of claim 1, wherein f) includes determining a boundary tone classification for the input window of sound.

18. An apparatus for tone recognition in spoken language processing, comprising:
a processor;
a memory; and
computer coded instructions embodied in the memory and executable by the processor, wherein the computer coded instructions are configured to implement a method for tone recognition, the method comprising:
a) determining an auditory spectrum for an input window of sound;
b) extracting one or more multi-scale features from the auditory spectrum, wherein each multi-scale feature is extracted using a separate two-dimensional spectro-temporal receptive filter;
c) generating one or more feature maps corresponding to the one or more multi-scale features;
d) extracting an auditory gist vector from each of the one or more feature maps;
e) obtaining a cumulative gist vector through augmentation of each auditory gist vector extracted from the one or more feature maps;
f) determining one or more tonal characteristics corresponding to the input window of sound by mapping the cumulative gist vector to one or more tonal characteristics using a machine learning algorithm;
g) identifying a sequence of phonemes in the input window of sound, wherein the sequence of phonemes matches a plurality of different lexical meanings in a tone language;
h) combining the identified sequence of phonemes with the determined tonal characteristics; and
i) identifying a lexical meaning in the tone language of the combination from among the plurality of different lexical meanings by determining a match between the combination and a corresponding tone and phoneme sequence combination in a speech recognition database for the tone language.

19. A computer program product comprising:
a non-transitory, computer-readable storage medium having computer readable program code embodied in said medium for tone recognition, said computer program product having:
a) computer readable program code means for determining an auditory spectrum for an input window of sound;
b) computer readable program code means for extracting one or more multi-scale features from the auditory spectrum, wherein each multi-scale feature is extracted using a separate two-dimensional spectro-temporal receptive filter;
c) computer readable program code means for generating one or more feature maps corresponding to the one or more multi-scale features;
d) computer readable program code means for extracting an auditory gist vector from each of the one or more feature maps;
e) computer readable program code means for obtaining a cumulative gist vector through augmentation of each of the auditory gist vectors;
f) computer readable program code means for determining one or more tonal characteristics corresponding to the input window of sound by mapping each cumulative gist vector extracted from the one or more feature maps to one or more tonal characteristics using a machine learning algorithm;
g) computer readable program code means for identifying a sequence of phonemes in the input window of sound, wherein the sequence of phonemes matches a plurality of different lexical meanings in a tone language;
h) computer readable program code means for combining the identified sequence of phonemes with the determined tonal characteristics; and
i) computer readable program code means for identifying a lexical meaning in the tone language of the combination from among the plurality of different lexical meanings by determining a match between the combination and a corresponding tone and phoneme sequence combination in a speech recognition database for the tone language.

* * * * *